(12) United States Patent
Aikawa

(10) Patent No.: US 11,113,486 B1
(45) Date of Patent: Sep. 7, 2021

(54) LIGHT EMITTING APPARATUS AND NON-TRANSITORY COMPUTER READABLE MEDIUM

(71) Applicant: FUJIFILM BUSINESS INNOVATION CORP., Tokyo (JP)

(72) Inventor: Kiyofumi Aikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/933,003

(22) Filed: Jul. 20, 2020

(30) Foreign Application Priority Data

Feb. 18, 2020 (JP) ............................. JP2020-025120

(51) Int. Cl.
*G06K 7/10* (2006.01)

(52) U.S. Cl.
CPC ................................. *G06K 7/10712* (2013.01)

(58) Field of Classification Search
CPC .... G06K 7/10; G06K 7/10712; G06K 7/1404; H04B 10/00
See application file for complete search history.

(56) References Cited

U.S. PATENT DOCUMENTS

| | | | |
|---|---|---|---|
| 5,793,630 A * | 8/1998 | Theimer | G01S 5/16 340/10.42 |
| 6,211,779 B1 * | 4/2001 | Gibb | B60Q 1/2611 340/464 |
| 6,286,762 B1 * | 9/2001 | Reynolds | G06K 7/0008 235/472.01 |
| 6,411,198 B1 * | 6/2002 | Hirai | H04M 3/42051 340/7.2 |
| 9,227,555 B2 * | 1/2016 | Kalapodas | B60Q 1/04 |
| 10,029,112 B1 * | 7/2018 | Fischell | A61N 2/008 |
| 10,447,942 B1 * | 10/2019 | Shaick | G06T 5/50 |
| 10,540,700 B1 * | 1/2020 | Chilukuri | H04N 5/2253 |
| 2003/0042310 A1 * | 3/2003 | Olds | B60Q 1/326 235/454 |
| 2003/0137852 A1 * | 7/2003 | Rapisarda | A41D 27/085 362/570 |
| 2004/0004627 A1 * | 1/2004 | Ohki | H04N 19/94 345/698 |
| 2004/0102223 A1 * | 5/2004 | Lo | G09G 3/005 455/566 |
| 2004/0161246 A1 * | 8/2004 | Matsushita | G06F 3/0481 398/187 |
| 2004/0164166 A1 * | 8/2004 | Mahany | G06F 11/324 235/472.02 |
| 2005/0001153 A1 * | 1/2005 | Lauffenburger | G06F 3/0317 250/221 |
| 2005/0089823 A1 * | 4/2005 | Stillman | G09B 19/08 434/112 |

(Continued)

FOREIGN PATENT DOCUMENTS

| | | |
|---|---|---|
| JP | 2005-252399 A | 9/2005 |
| JP | 2006-153828 A | 6/2006 |

*Primary Examiner* — Daniel I Walsh
(74) *Attorney, Agent, or Firm* — Oliff PLC

(57) ABSTRACT

A light emitting apparatus includes a light source, and a processor configured to perform control to cause the light source to blink in a blink pattern corresponding to output information including identification information unique to the light emitting apparatus, and configured to, when causing the light source to blink by repeating the blink pattern, change a time interval between the blink patterns.

6 Claims, 13 Drawing Sheets

(56) References Cited

U.S. PATENT DOCUMENTS

| | | | |
|---|---|---|---|
| 2005/0165321 A1* | 7/2005 | Fischell | A61B 5/349 600/515 |
| 2005/0237020 A1* | 10/2005 | Horstmann | G05B 19/00 318/580 |
| 2006/0062582 A1* | 3/2006 | Suzuki | H04B 10/502 398/183 |
| 2006/0239675 A1* | 10/2006 | Iizuka | H04N 7/142 396/287 |
| 2007/0285238 A1* | 12/2007 | Batra | G06K 7/0008 340/572.1 |
| 2008/0061967 A1* | 3/2008 | Corrado | G06K 19/07345 340/539.26 |
| 2008/0238345 A1* | 10/2008 | Jaan | H05B 45/00 315/325 |
| 2009/0039235 A1* | 2/2009 | MacFarlane | G01R 33/4806 250/206.1 |
| 2009/0231150 A1* | 9/2009 | Feight | G01R 35/00 340/636.1 |
| 2010/0039581 A1* | 2/2010 | Mishima | H05B 41/295 349/61 |
| 2010/0289645 A1* | 11/2010 | Hand | G08B 13/1481 340/572.1 |
| 2011/0306419 A1* | 12/2011 | Miyazaki | G06F 21/35 463/36 |
| 2012/0223477 A1* | 9/2012 | Zylkin | A63F 9/0468 273/146 |
| 2013/0062534 A1* | 3/2013 | Cole | A61N 5/0624 250/454.11 |
| 2013/0258488 A1* | 10/2013 | Hatakeyama | B60K 35/00 359/630 |
| 2014/0125451 A1* | 5/2014 | Sako | H05B 47/105 340/4.2 |
| 2016/0162907 A1* | 6/2016 | Liu | G06K 7/1408 235/462.41 |
| 2016/0180685 A1* | 6/2016 | Glasgow | G06Q 10/00 340/540 |
| 2018/0063421 A1* | 3/2018 | Yokomitsu | H04N 5/77 |
| 2018/0215542 A1* | 8/2018 | Ueda | B65G 1/1371 |
| 2018/0334214 A1* | 11/2018 | Cuban | B62J 15/02 |
| 2019/0050697 A1* | 2/2019 | Meng | G06K 19/07749 |
| 2019/0080796 A1* | 3/2019 | Greiner | G16H 40/20 |
| 2019/0091554 A1* | 3/2019 | Rautiainen | A63C 17/012 |
| 2020/0266891 A1* | 8/2020 | Murakami | H04B 10/116 |
| 2020/0313774 A1* | 10/2020 | Murakami | H04B 10/541 |
| 2020/0363490 A1* | 11/2020 | Densham | G01S 5/16 |
| 2021/0150864 A1* | 5/2021 | Aikawa | H04N 5/2352 |

* cited by examiner

LIGHT EMITTING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-025120 filed Feb. 18, 2020.

BACKGROUND

(i) Technical Field

The present disclosure relates to a light emitting apparatus and a non-transitory computer readable medium.

(ii) Related Art

There is a system including plural light emitting apparatuses and a camera. Each light emitting apparatus (also referred to as a tag) is attached to an object, such as a person or an item, and includes a light source that blinks in a blink pattern corresponding to output information including unique identification information. The camera is an apparatus that captures an image of light rays emitted by the light sources of the plural light emitting apparatuses. The system identifies the individual light emitting apparatuses (individual objects) on the basis of the blink patterns of the light emitting apparatuses appearing in an image captured by the camera, and specifies the positions of the individual objects. Hereinafter, this system will be referred to as a light emitting apparatus recognition system.

Japanese Unexamined Patent Application Publication No. 2006-153828 discloses an apparatus in which an infrared generator irradiates many tags with infrared light having an ID superimposed thereon, and a tag having an ID identical to the ID emits light.

Japanese Unexamined Patent Application Publication No. 2005-252399 discloses a system including an optical tag whose light source blinks to represent a unique ID and a video camera that captures an image of the blink of the light source. In this system, the ID is decoded by processing a camera image obtained by the video camera, and a light point of the optical tag included in the camera image is tracked.

SUMMARY

In a system that recognizes a light emitting apparatus, when two or more objects each having a light emitting apparatus attached thereto approach each other and light rays emitted by the two or more light emitting apparatuses appear in a small region of an image captured by a camera, blink patterns of the individual light emitting apparatuses may appear overlapping with each other in the captured image and may be unrecognizable.

Aspects of non-limiting embodiments of the present disclosure relate to, even in a case where two or more objects each having a light emitting apparatus attached thereto approach each other and light rays emitted by the two or more light emitting apparatuses appear in a small region of an image captured by a camera, making it possible to recognize blink patterns of the individual light emitting apparatuses in the captured image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a light emitting apparatus including a light source, and a processor configured to perform control to cause the light source to blink in a blink pattern corresponding to output information including identification information unique to the light emitting apparatus, and configured to, when causing the light source to blink by repeating the blink pattern, change a time interval between the blink patterns.

BRIEF DESCRIPTION OF THE DRAWINGS

Exemplary embodiments of the present disclosure will be described in detail based on the following figures, wherein.

DETAILED DESCRIPTION

Figure 1:
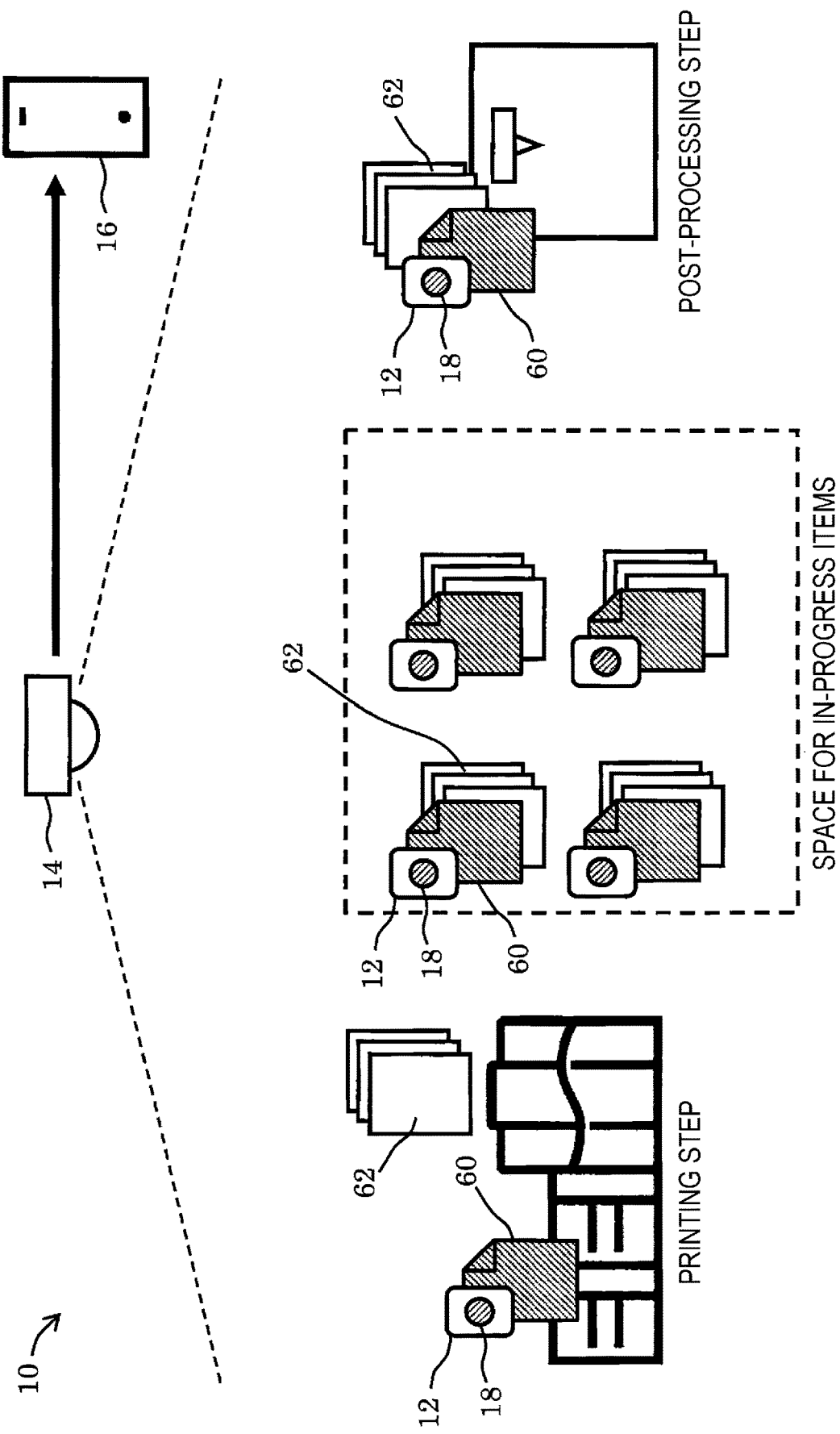
FIG. 1 is a diagram illustrating a schematic configuration of a tag recognition system according to an exemplary embodiment of the present disclosure.

Hereinafter, individual exemplary embodiments of the present disclosure will be described in detail with reference to the attached drawings. The configurations described below are examples for description and may be changed as appropriate in accordance with the specifications or the like of a system, an apparatus, or a member. In a case where there are plural exemplary embodiments, modification examples, or the like, use of the features thereof in appropriate combination is originally assumed. In all figures, the same components are denoted by the same reference numerals and a duplicate description will be omitted.

FIG. 1 is a diagram illustrating a schematic configuration of a tag recognition system 10 according to an exemplary embodiment of the present disclosure. The tag recognition system 10 includes plural tags 12 and a camera 14. Each of the tags 12 is a light emitting apparatus attached to a movable object, such as a person, an animal, or an item, and including a light source 18 that blinks in a blink pattern corresponding to output information including unique identification information. The camera 14 is an apparatus that captures an image of light rays emitted by the light sources 18 of the plural tags 12. The tag recognition system 10 also includes a recognition apparatus 16 that identifies the individual tags 12 on the basis of light rays emitted by the light sources 18 of the plural tags 12 and appearing in an image captured by the camera 14 and specifies the positions of the individual tags 12. The number of tags 12 and the number of cameras 14 are changed as appropriate.

FIG. 1 illustrates an example in which the tag recognition system 10 is used to manage manufacturing of printed materials. A process of manufacturing printed materials includes a printing step of performing printing on a medium, a post-processing step of performing cutting, folding, or the like on a printed result (also referred to as an intermediate 62) obtained through the printing step, and a delivery step (not illustrated) of delivering a post-processed result (not illustrated, also referred to as an intermediate 62) obtained through the post-processing step. In a printing company, various types of printed materials are manufactured. The process to be performed varies according to a printed material, and thus a work procedure manual 60 is managed together with the intermediate 62. For example, there are operators for individual steps. An operator receives the work procedure manual 60 and the intermediate 62 from an operator of the preceding step, processes the intermediate 62 in accordance with the work procedure manual 60, fills out the work procedure manual 60 by hand to indicate that the step has been completed, and transfers the set of the work procedure manual 60 and the processed intermediate 62 to the next step. The set of the work procedure manual 60 and the intermediate 62 may be placed in a space for in-progress items to be processed in the next step, as illustrated in FIG. 1.

The tag recognition system 10 is used to specify the current step or current position of each printed material. As illustrated in FIG. 1, the tags 12 are attached to the respective work procedure manuals 60, and the light sources 18 of the tags 12 blink on the basis of pieces of identification information unique to the printed materials having the tags 12 attached thereto. The camera 14 captures an image of light rays emitted by the light sources 18 of the plural tags 12, and the captured image is transmitted to the recognition apparatus 16. The recognition apparatus 16 identifies the individual printed materials (individual intermediates 62) on the basis of the light rays emitted by the light sources 18 of the individual tags 12 and appearing in the captured image, and specifies the positions of the individual printed materials. This usage style of the tag recognition system 10 is merely an example, and the usage style of the tag recognition system 10 is not limited.

Figure 2:
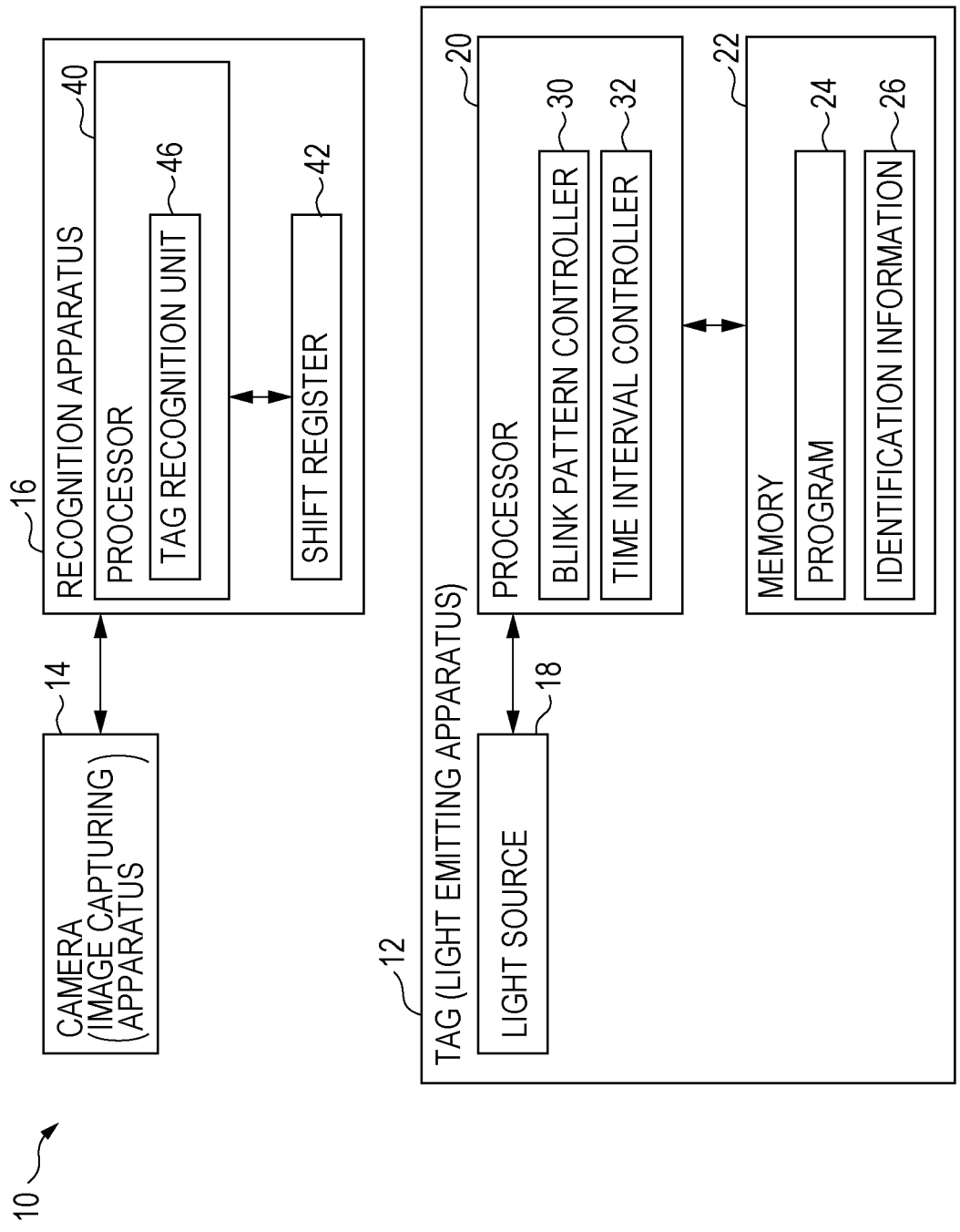
FIG. 2 is a block diagram of the tag recognition system.

FIG. 2 is a block diagram of the tag recognition system 10 according to the present exemplary embodiment. The tag recognition system 10 includes the tag 12 serving as a light emitting apparatus, the camera 14, and the recognition apparatus 16. The light source 18 of the tag 12 is an infrared light emitting element that emits an infrared ray. The camera 14 is an infrared camera capable of capturing an image of an infrared ray emitted by the light source 18 of the tag 12. The camera 14 includes a wide-angle lens and is thus capable of capturing an image at 180 degrees or a wide angle approximate to 180 degrees.

The tag 12 includes the light source 18 that blinks with an infrared ray on the basis of identification information 26 unique to the tag 12, a processor 20 electrically connected to the light source 18, a memory 22 that stores a program 24 for operating the processor 20 and the identification information 26 unique to the tag 12, and a battery (not illustrated) that supplies power to the individual components in the tag 12. The processor 20 reads out the program 24 from the memory 22 and operates in accordance with the program 24, thereby functioning as a computer. In particular, the processor 20 operates in accordance with the program 24 to function as a blink pattern controller 30 that performs control to cause the light source 18 to blink in a blink pattern corresponding to output information including the identification information 26, and a time interval controller 32 that performs control to change the time interval between blink patterns when causing the light source 18 to blink by repeating the blink pattern.

The recognition apparatus 16 is connected to the camera 14 in a wired or wireless manner. The recognition apparatus 16 includes a processor 40, a shift register 42, and a memory (not illustrated) that stores a program for operating the processor 40. The processor 40 acquires moving images sequentially transmitted from the camera 14 and stores, in the shift register 42, image data of still images obtained by extracting frames from the moving images. Hereinafter, the image data of a still image obtained by extracting a frame from a moving image will be referred to as a frame image. The shift register 42 temporarily stores captured images (also referred to as captured moving images) composed of many frame images captured by the camera 14 within a certain past period. The processor 40 functions as a tag recognition unit 46 that reads out a captured image from the shift register 42, interprets the blink of the light source 18 of the tag 12 appearing in the captured image to identify the tag 12, and specifies the position of the tag 12 on the basis of the position of light in the captured image.

In a case where the tag recognition system 10 includes plural cameras 14, one common recognition apparatus 16 may be provided for the plural cameras 14. In this case, when images of the tag 12 are captured by the plural cameras 14, the position of the tag 12 may be specified on the basis of the positions of the individual cameras 14 and the images captured by the individual cameras 14.

Figure 3:
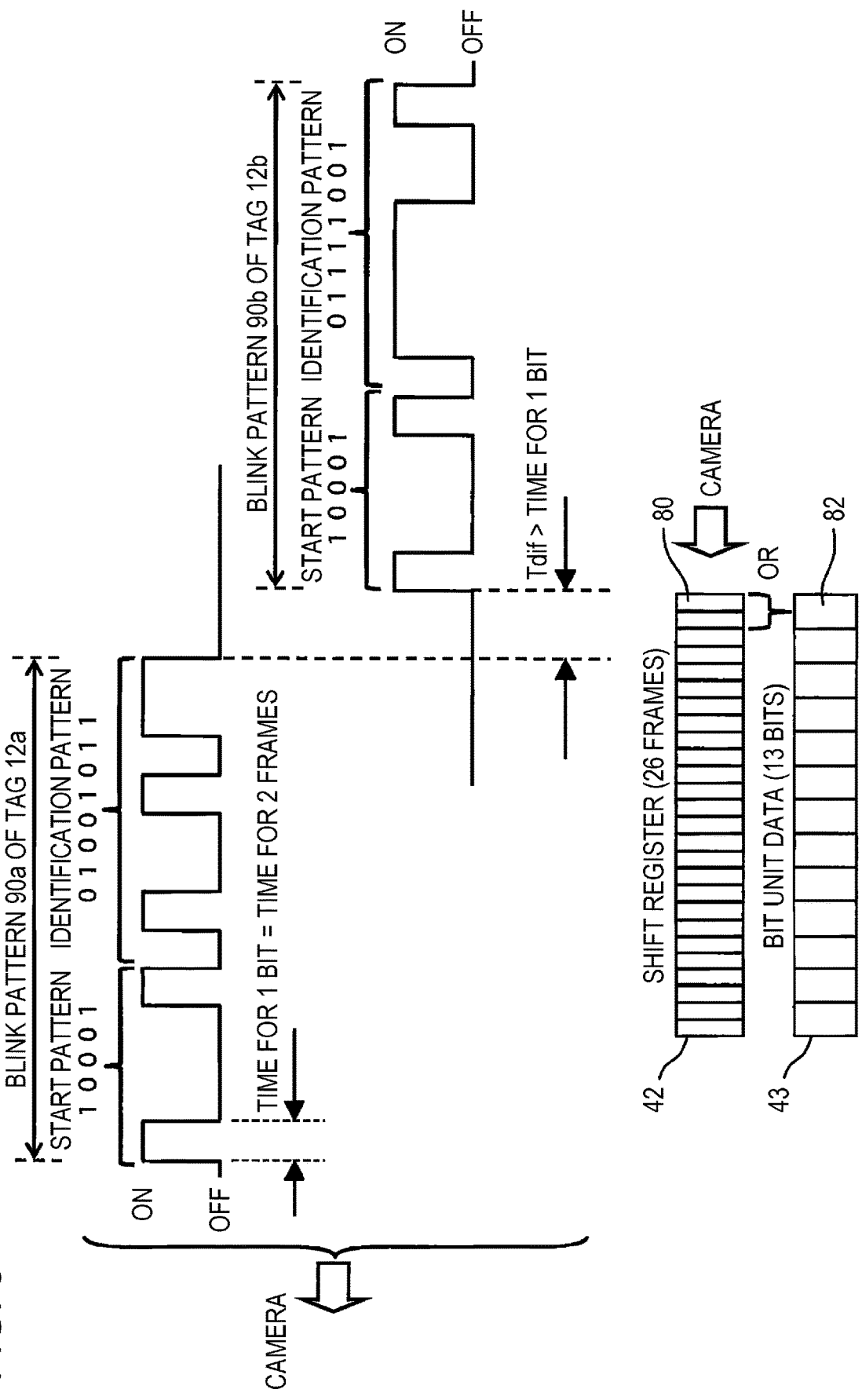
FIG. 3 is a diagram illustrating an example of a case where blink patterns of two tags do not temporally overlap each other.
Figure 4:
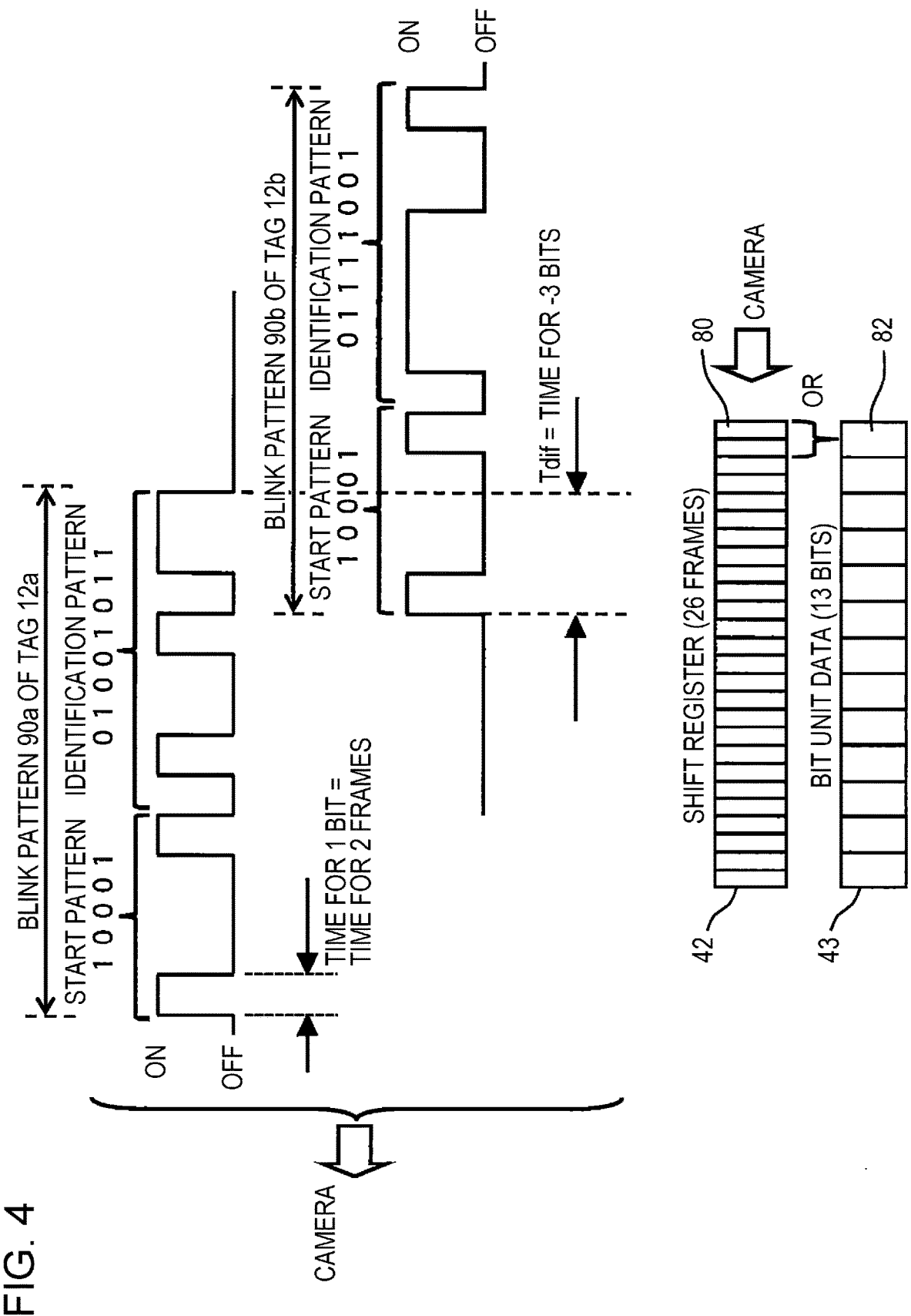
FIG. 4 is a diagram illustrating an example of a case where blink patterns of two tags temporally overlap each other.

Next, a blink pattern of the light source 18 of the tag 12 will be described. FIG. 3 is a diagram illustrating an example of a case where blink patterns 90a and 90b of two tags 12a and 12b do not temporally overlap each other. FIG. 4 is a diagram illustrating an example of a case where the blink patterns 90a and 90b of the two tags 12a and 12b temporally overlap each other. In FIG. 3 and FIG. 4, the right-left direction represents a time axis.

As illustrated in FIG. 3, a blink pattern is formed of a start pattern indicating the start of the blink pattern and an identification pattern defined uniquely to each tag. The processor 20 of the tag 12 reads out start information (not illustrated) and the identification information 26 unique to the tag 12 from the memory 22, and encodes the start information and the identification information 26 to generate a start pattern and an identification pattern. That is, output information formed of the start information and the identification information is encoded to generate a blink pattern.

Each of the start pattern and the identification pattern is formed by combining plural 0 or 1. 0 or 1 is represented by using twice a frame time period (also referred to as two frame time periods). OFF for two frame time periods of the light source 18 of the tag 12 represents 0, and ON for two frame time periods of the light source 18 of the tag 12 represents 1. Here, a frame time period is a time interval of a frame image captured and acquired by the camera 14. For example, in a case where the camera 14 acquires 30 frame images per second, the frame time period is about 33 milliseconds. The start pattern is formed of a bit string of 5 bits that is common to the tags 12a and 12b, and the identification pattern is formed of a bit string of 8 bits that varies between the tags 12a an 12b. The light sources of the tags 12a and 12b are controlled to repeatedly output the blink patterns 90a and 90b, respectively.

The blinks of the light sources of the tags 12a and 12b are captured by the camera 14, and the captured frame images are sequentially transmitted to the recognition apparatus 16. As illustrated in FIG. 3 and FIG. 4, the recognition apparatus 16 includes the shift register 42 for 26 frame images. The frame images from the camera 14 are sequentially input to the shift register 42.

The recognition apparatus 16 performs OR operation on two adjacent frame images 80 stored in the shift register 42 to generate a bitmap image 82, and generates bit unit data 43 formed of 13 bitmap images 82. Here, the bitmap image 82 is an image obtained by, for example, comparing the luminance values of pixels at the same positions in the two frame images 80 and forming the individual pixels by adopting the larger luminance values.

Figure 7:
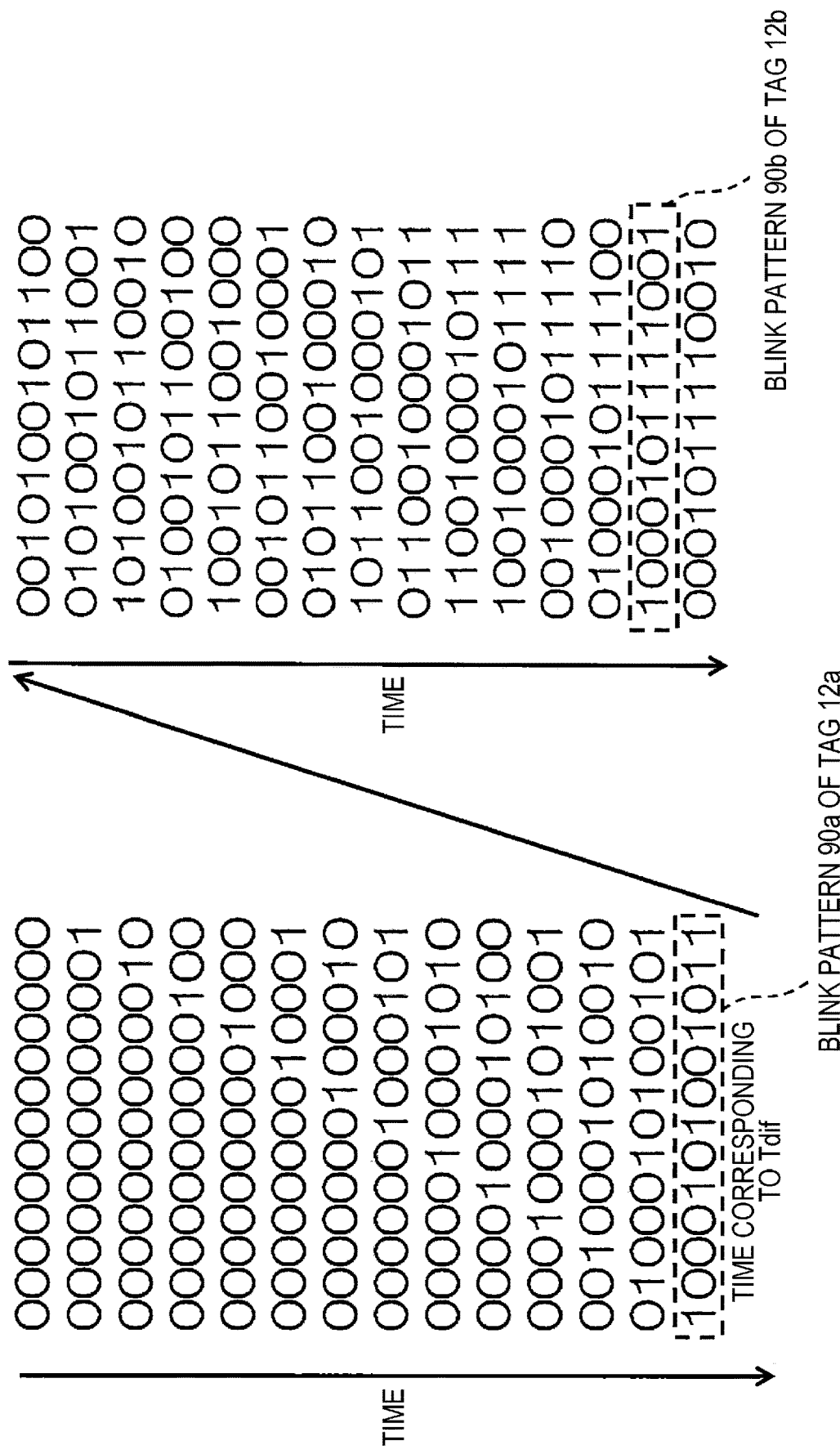
FIG. 7 is a diagram for describing identification of two tags in a case where blink patterns of the two tags do not temporally overlap each other.

As described above, each of 0 (OFF) and 1 (ON) of the blink pattern of the tag is represented by using two frame time periods and appears in two consecutive frame images. Thus, as a result of checking, every two frame time periods, the bit unit data 43 formed by combining the bitmap images 82 each of which is obtained by performing OR operation on two frame images, blink patterns of the tags gradually appear in the bit unit data 43, as illustrated in FIG. 7. FIG. 7 illustrates an example in which the blink pattern 90a of the tag 12a appears in a lower left portion of the bit unit data 43 and the blink pattern 90b of the tag 12b appears in a lower right portion of the bit unit data 43. Each bitmap image 82 constituting the bit unit data 43 is image data for one screen, and thus a code sequence as illustrated in FIG. 7 can be obtained for the pixels of one screen.

The tag recognition unit 46 of the recognition apparatus 16 interprets the bit unit data 43, thereby acquiring the pieces of identification information 26 of the tags 12a and 12b and identifying the tags 12a and 12b. The tag recognition unit 46 specifies the positions of the tags 12a and 12b on the basis of the positions of light rays emitted by the light sources of the tags 12a and 12b and appearing in a frame image.

Figure 5:
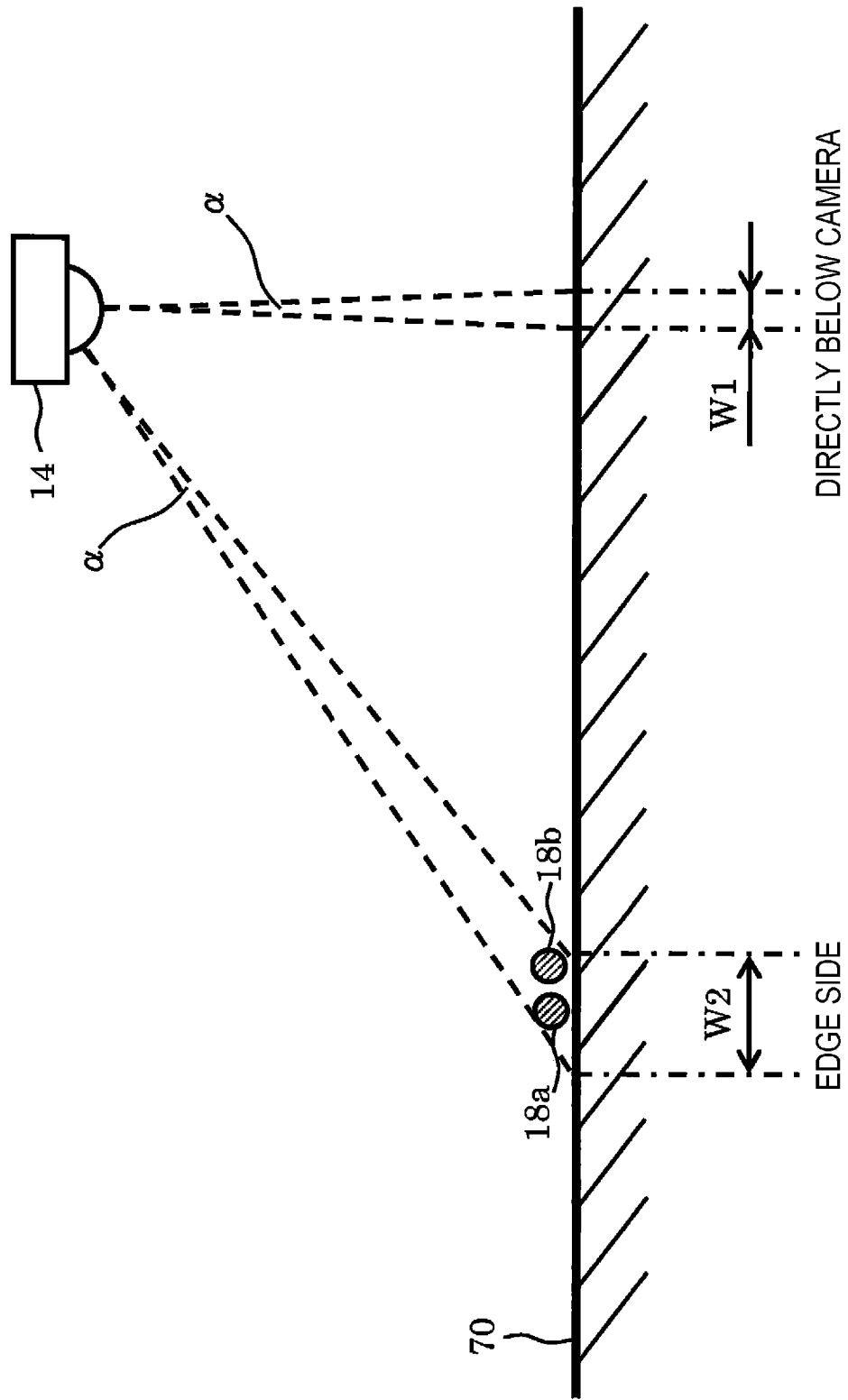
FIG. 5 is a diagram for describing that the image capturing area per pixel varies according to a place.

In some cases, light rays emitted by light sources of plural tags may appear overlapping with each other in a frame image. FIG. 5 illustrates a state where the camera 14 is placed at a predetermined height from a flat plane 70 and the camera 14 captures an image of light rays emitted by light sources 18a and 18b of two tags (the contours of the tags are not illustrated) placed on the flat plane 70. At the vicinity of the center of the lens of the camera 14 (at the portion of capturing an image of the vicinity of the region directly below the camera 14), the distance from the camera 14 to the flat plane 70 is short, and thus the image capturing range on the flat plane 70 at an angle of view a of the camera 14 is narrow. On the other hand, at the vicinity of the edge of the lens of the camera 14 (at the portion of capturing an image of an edge side away from the camera 14), the distance from the camera 14 to the flat plane 70 is long, and thus the image capturing range on the flat plane 70 at an angle of view a of the camera 14 is wide. This means that the image capturing area per pixel of an image capturing device of the camera 14 is small at the vicinity of the region directly below the camera 14 and is large at the edge side away from the camera 14.

Figure 6:
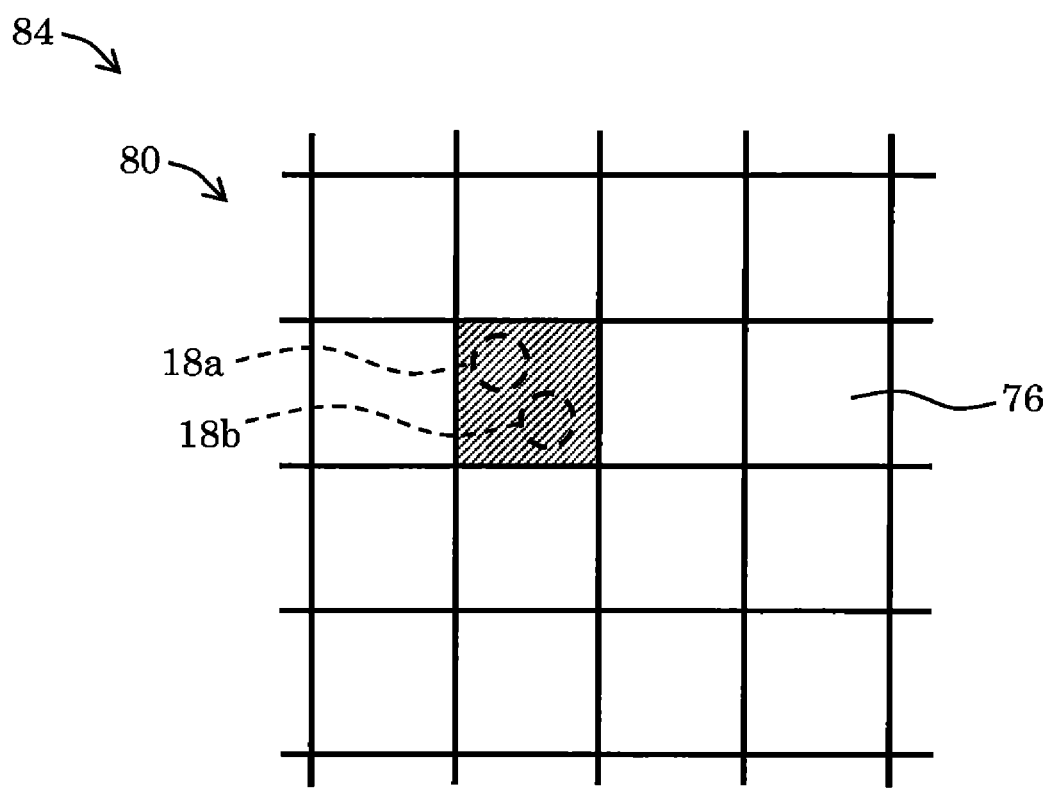
FIG. 6 is a diagram for describing that light rays of plural tags appear in one pixel in a frame image.

Thus, in a case where the light sources 18a and 18b of two tags are located close to each other at the edge side away from the camera 14 as illustrated in FIG. 5, there is a high possibility that the camera 14 captures an image of light rays overlapping each other of the two light sources 18a and 18b. In a case where the camera 14 captures an image of light rays overlapping each other, the light rays overlapping each other of the two light sources 18a and 18b appear in one pixel 76 in each frame image 80 forming a captured image 84 of the camera 14 as illustrated in FIG. 6, and thus the individual tags are not identifiable.

In addition to the case where light rays emitted by the two light sources 18a and 18b appear overlapping with each other in the frame image 80, there may be a case where light rays emitted by the two light sources 18a and 18b appear in pixels close to each other or a case where each of light rays emitted by the two light sources 18a and 18b appears in plural pixels and the parts thereof overlap each other or close to each other. In these cases, when the frame image 80 is processed in units of a certain number of pixels (for example, in units of 8×8 pixels or 32×32 pixels), for example, there is a possibility that the individual tags are not identifiable.

In the above-described case, there are plural tags at the edge side away from the camera 14. Also in a case where there are plural tags directly below the camera 14, when the number of pixels of the image capturing device of the camera 14 is small (low resolution) or when the tags are very close to each other, light rays emitted by the plural tags appear in the same pixel or pixels close to each other in the frame image 80, and a similar problem may occur.

As illustrated in FIG. 3, when a time difference Tdif between the blink patterns 90a and 90b of the two tags 12a and 12b is a time period corresponding to 1 bit (two frame time periods) or longer, the two individual tags 12a and 12b are identifiable even if the two tags 12a and 12b are located close to each other and light rays emitted by the two light sources 18a and 18b appear in the same pixel of a frame image. As illustrated in FIG. 7, when the pixels of the bit unit data 43 in which light rays emitted by the two light sources 18a and 18b appear are checked every two frame time periods, the blink pattern 90a of the tag 12a (the code surrounded by a broken line at the lower left in FIG. 7) appears first and then the blink pattern 90b of the tag 12b (the code surrounded by a broken line at the lower right in FIG. 7) appears. Thus, the individual tags 12a and 12b are identifiable.

Figure 8:
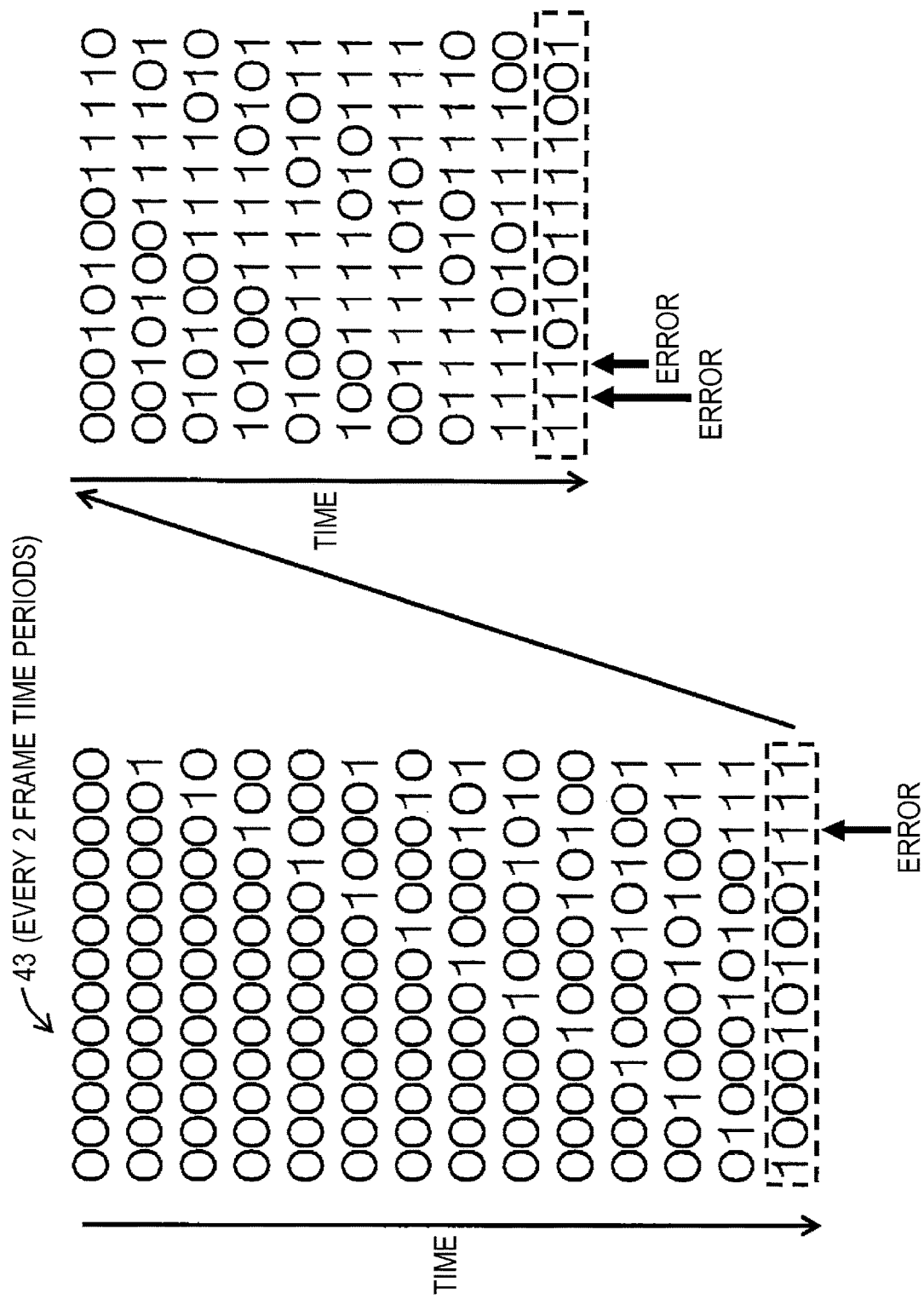
FIG. 8 is a diagram for describing identification of two tags in a case where blink patterns of the two tags temporally overlap each other.

On the other hand, in a case where the blink patterns 90a and 90b of the two tags 12a and 12b temporally overlap each other as illustrated in FIG. 4, that is, in a case where the time difference Tdif between the blink patterns 90a and 90b of the two tags 12a and 12b is a negative value, the individual tags 12a and 12b are not identifiable when the two tags 12a and 12b are located close to each other and light rays emitted by the two light sources 18a and 18b appear in the same pixel of a frame image. FIG. 8 illustrates a change in code sequence when the pixels of the bit unit data 43 in which light rays emitted by the two light sources 18a and 18b appear are checked every two frame time periods at the timings of the blink patterns 90a and 90b illustrated in FIG.

4. As illustrated in FIG. 8, the blink pattern 90a of the tag 12a is supposed to appear in the broken-line enclosure at the lower left. However, in the third bit from the right indicated by "error", 0 is replaced with 1 that is at the top of the start pattern "10001" of the tag 12b illustrated in FIG. 4, and thus the blink pattern 90a of the tag 12a does not appear. Also, the blink pattern 90b of the tag 12b is supposed to appear in the broken-line enclosure at the lower right. However, in the second and third bits from the left indicated by "error", 00 is replaced with 11 that is at the end of the identification pattern "01001011" of the tag 12a illustrated in FIG. 4, and thus the blink pattern 90b of the tag 12b does not appear. Thus, the individual tags 12a and 12b are not identifiable.

Figure 13:
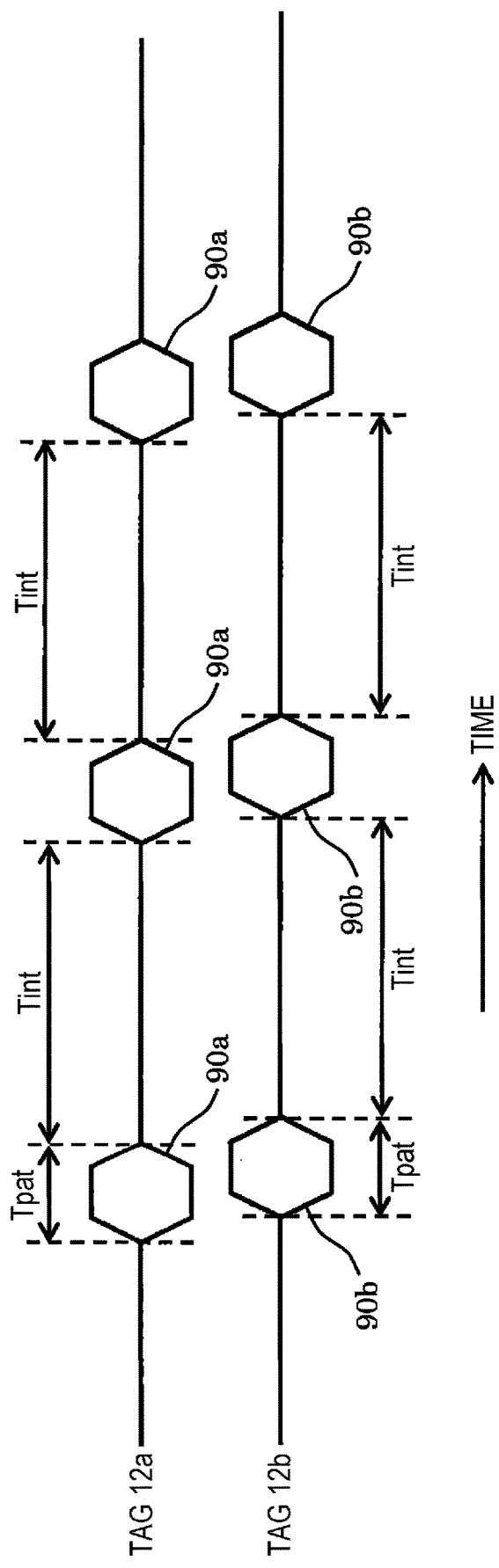
FIG. 13 is a diagram illustrating an example of time intervals of blink patterns of tags according to the related art.

The temporal overlap between the blink patterns 90a and 90b of the two tags 12a and 12b illustrated in FIG. 4 continues for a long time in the related art. As illustrated in FIG. 13, in the related art, when the tags 12a and 12b repeatedly output the blink patterns 90a and 90b, a blink time period Tpat of each blink pattern 90a of the tag 12a is identical to a blink time period Tpat of each blink pattern 90b of the tag 12b, and a time interval Tint of the blink patterns 90a of the tag 12a is identical to a time interval Tint of the blink patterns 90b of the tag 12b. Thus, the blink pattern 90a of the tag 12a and the blink pattern 90b of the tag 12b temporally overlap each other repeatedly over a long time.

Accordingly, the tags 12 of the present exemplary embodiment have a mechanism of operating to ensure the opportunity to recognize the blink patterns of the individual tags 12 in an image captured by the camera 14 even in a case where light rays emitted by two or more tags 12 appear in a small region of the captured image. This is realized by the processor 20 of the tag 12 (see FIG. 2) functioning as the time interval controller 32 that changes the time interval Tint between blink patterns when causing the light source 18 to blink so as to repeatedly output a blink pattern.

Figure 9:
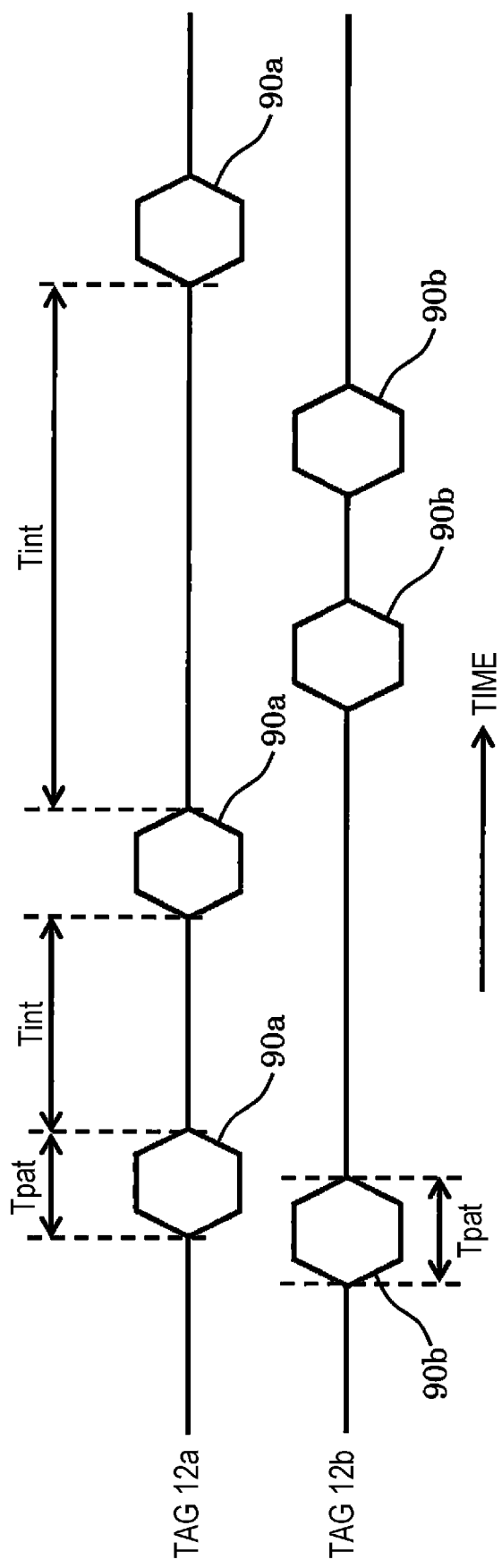
FIG. 9 is a diagram illustrating an example of time intervals of blink patterns of tags.

Accordingly, as illustrated in FIG. 9, an opportunity is made in which the blink time periods Tpat of the blink patterns 90a and 90b of the tags 12a and 12b are staggered from each other, and an opportunity to identify the blink patterns 90a and 90b of the tags 12a and 12b in an image captured by the camera 14 is ensured even in a case where light rays emitted by the tags 12a and 12b appear in a small region of the captured image.

Alternatively, the time interval controller 32 of the tag 12a (12b) may randomly change the time interval Tint between the blink patterns 90a (90b) when causing the light source 18 to blink so as to repeat the blink pattern 90a (90b). In this case, an opportunity is more likely to be made in which the blink time periods Tpat of the blink patterns 90a and 90b of the tags 12a and 12b are staggered from each other, compared to a case where the time interval Tint between the blink patterns 90a (90b) is changed in accordance with a certain rule.

Alternatively, the time interval controller 32 of the tag 12a (12b) may set the time interval Tint between the blink patterns 90a (90b) to a time period that is n times (n is a positive integer) the blink time period Tpat of the blink pattern 90a (90b) and may randomly change n. In this case, an opportunity is more likely to be made in which the blink time periods Tpat of the blink patterns 90a and 90b of the tags 12a and 12b are staggered from each other, compared to a case where the time interval Tint between the blink patterns 90a (90b) includes a time period shorter than the blink time period Tpat of the blink pattern 90a (90b).

Figure 10:
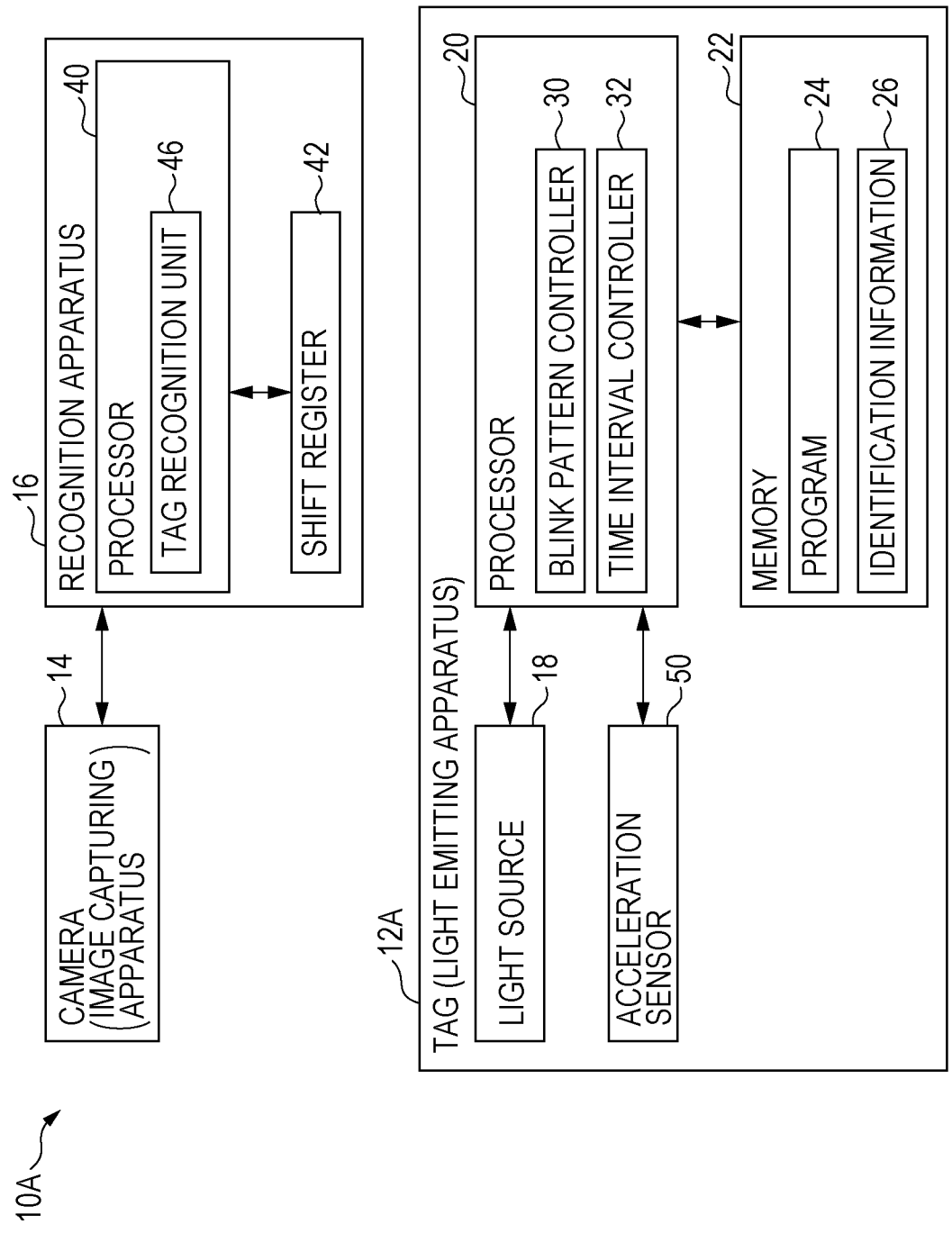
FIG. 10 is a block diagram of a tag recognition system according to another exemplary embodiment.

Next, a tag recognition system 10A according to another exemplary embodiment will be described. FIG. 10 is a block diagram of the tag recognition system 10A according the other exemplary embodiment. The block diagram in FIG. 10 is different from the block diagram in FIG. 2 in that a tag 12A includes an acceleration sensor 50 in FIG. 10. The acceleration sensor 50 is electrically connected to the processor 20 and outputs a detection signal to the processor 20.

Figure 11:
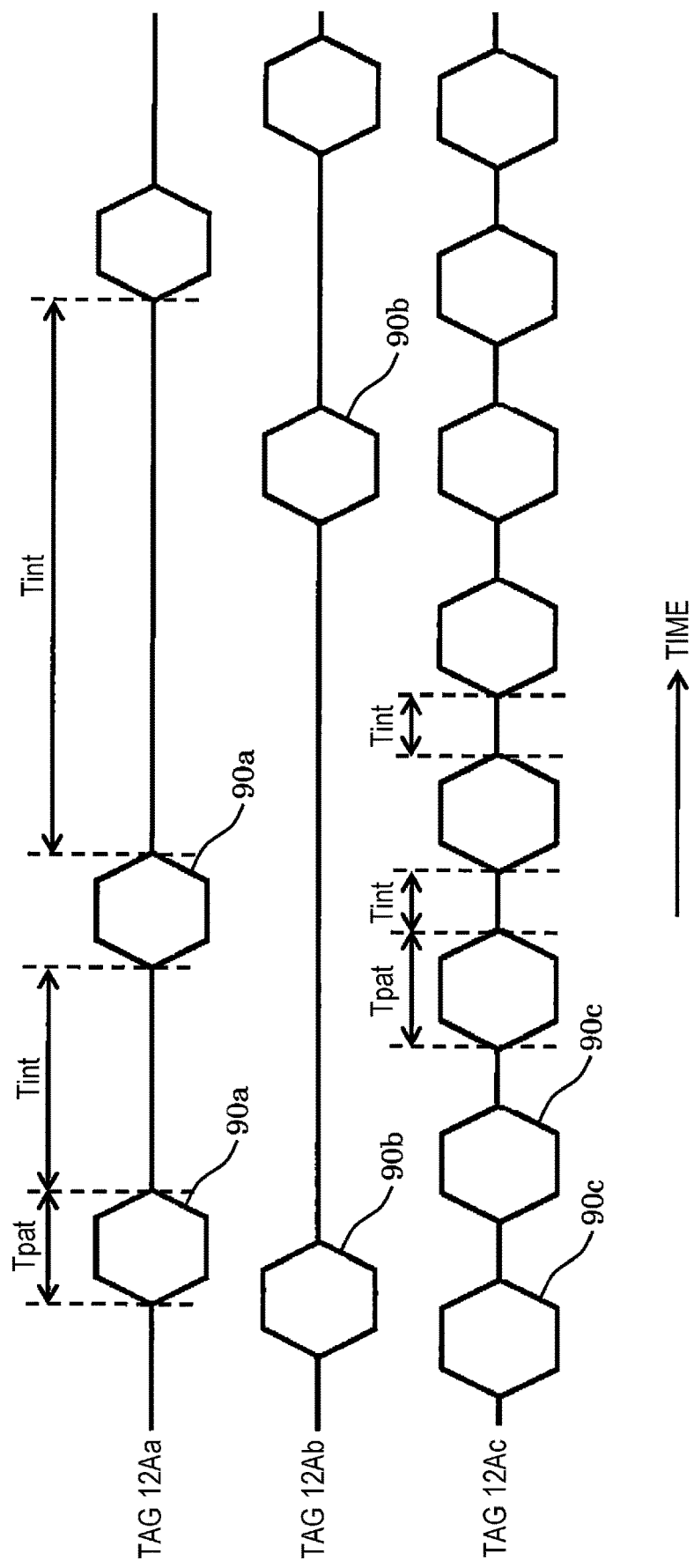
FIG. 11 is a diagram illustrating an example of time intervals of blink patterns of tags according to the other exemplary embodiment.

In the present exemplary embodiment, when the processor 20 of the tag 12A functions as the time interval controller 32 and causes the light source 18 to blink so as to repeat a blink pattern, the processor 20 changes the time interval Tint between blink patterns when the acceleration sensor 50 detects that the tag 12A is stationary, and makes the time interval Tint between blink patterns constant when the acceleration sensor 50 detects that the tag 12A is moving. FIG. 11 is a diagram illustrating an example of time intervals Tint of blink patterns 90a, 90b, and 90c of tags 12Aa, 12Ab, and 12Ac according to the present exemplary embodiment. The tags 12Aa and 12Ab are tags detected as being stationary by the acceleration sensor 50, and the tag 12Ac is a tag detected as moving by the acceleration sensor 50. When the tag 12Ac is moving, there is a high possibility that the light ray emitted by the tag 12Ac is away from the light rays emitted by the other tags 12Aa and 12Ab in an image captured by the camera 14, and there is a high possibility that an opportunity to identify the blink pattern of the tag 12Ac in the captured image is ensured even if the time interval Tint between the blink patterns 90c of the tag 12Ac is not changed. Thus, with the configuration according to the present exemplary embodiment, it is possible to prevent an unnecessary change in the time interval Tint between the blink patterns 90c of the moving tag 12Ac.

In the exemplary embodiment illustrated in FIG. 10, when the acceleration sensor 50 detects that the tag 12A is stationary, the time interval controller 32 may set the time interval Tint between blink patterns to be longer than when the acceleration sensor 50 detects that the tag 12A is moving. FIG. 11 illustrates the operation with this configuration. When the tag 12Ac is moving and the time interval Tint between the blink patterns 90c is long, the tag 12Ac may disappear from the image capturing range of the camera 14 before the light ray emitted by the tag 12Ac appears in an image captured by the camera 14, and it may be impossible to track the tag 12Ac. On the other hand, when the tags 12Aa and 12Ab are stationary, the blink patterns 90a and 90b reliably appear in an image captured by the camera 14 even if the time interval Tint between the blink patterns 90a and the time interval Tint between the blink patterns 90b are long, and thus there is no concern described above about the tag 12Ac. Thus, when the tags 12Aa and 12Ab are stationary, excessive blinks of the light sources 18 of the tags 12Aa and 12Ab may be suppressed by setting the time interval Tint between the blink patterns 90a and the time interval Tint between the blink patterns 90b to be long. In addition, as a result of setting the time interval Tint between the blink patterns 90a of the tag 12Aa and the time interval Tint between the blink patterns 90b of the tag 12Ab to be long, the blink patterns 90a of the tag 12Aa and the blink patterns 90b of the tag 12Ab are less likely to temporally overlap each other. Accordingly, even in a case where light rays emitted by the tags 12Aa and 12Ab appear in a small region of an image captured by the camera 14, an opportunity to identify the blink patterns 90a and 90b of the tags 12Aa and 12Ab in the captured image is ensured more reliably.

Figure 12:
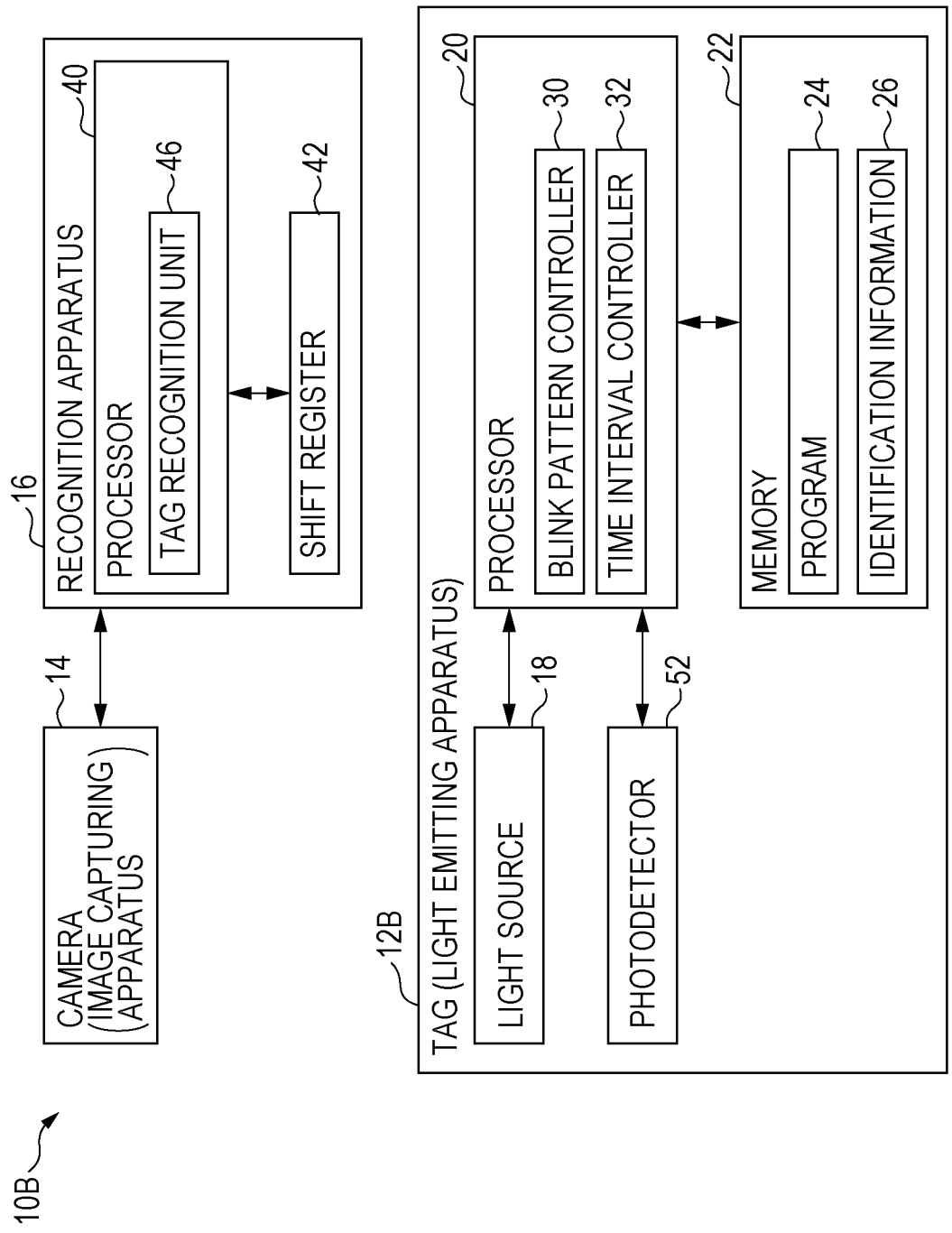
FIG. 12 is a block diagram of a tag recognition system according to still another exemplary embodiment.

Next, a tag recognition system 10B according to still another exemplary embodiment will be described. FIG. 12 is a block diagram of the tag recognition system 10B according the other exemplary embodiment. The block diagram in FIG. 12 is different from the block diagram in FIG. 2 in that a tag 12B includes a photodetector 52 in FIG. 12. The photodetector 52 is electrically connected to the processor 20 and outputs a detection signal to the processor 20.

In the present exemplary embodiment, when the processor 20 of the tag 12B functions as the time interval controller 32 and causes the light source 18 to blink so as to repeat a blink pattern, the processor 20 changes the time interval Tint between blink patterns when the photodetector 52 detects light emitted by the light source 18 of another tag, and makes the time interval Tint between blink patterns constant when the photodetector 52 does not detect light emitted by the light source 18 of another tag. When the photodetector 52 of the tag 12B does not detect light emitted by another tag, there is a high possibility that the light emitted by the tag 12B is away from the light emitted by the other tag in an image captured by the camera 14, and there is a high possibility that an opportunity to identify the blink pattern of the tag 12B in the captured image is ensured even if the time interval Tint between the blink patterns of the tag 12B is not changed. Thus, with the configuration described above, it is possible to prevent an unnecessary change in the time interval Tint between the blink patterns of the tag 12B when the photodetector 52 of the tag 12B does not detect light emitted by another tag.

In the above-described individual exemplary embodiments, the light source 18 of the tag 12 emits an infrared ray, and the camera 14 is an infrared camera that captures an image of the light. Alternatively, the light source 18 of the tag 12 may emit visible light (a kind of electromagnetic wave) instead of an infrared ray, and the camera 14 may be configured to capture an image of the visible light.

The blink pattern output from the light source 18 of the tag 12 may be a pattern in which an end pattern follows an identification pattern or a pattern in which a pattern for error detection or correction is added. The type of blink pattern is not limited.

In the above-described individual exemplary embodiments, the tag recognition unit 46 of the recognition apparatus 16 identifies the tag 12 in a captured image and specifies the position of the tag 12. Alternatively, the tag recognition unit 46 may be configured to identify the tag 12 in a captured image and not to specify the position of the tag 12. In this specification, "recognition of the tag (light emitting apparatus)" may include identification of the tag in a captured image and may not include specification of the position of the tag. The "tag recognition system" includes a system that identifies a tag (light emitting apparatus) in a captured image and that does not specify the position of the tag (light emitting apparatus).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A light emitting apparatus comprising:
a light source;
a processor configured to
perform control to cause the light source to blink in a blink pattern corresponding to output information including identification information unique to the light emitting apparatus and stored in a memory of the light emitting apparatus, and
when causing the light source to blink by repeating the blink pattern, change a time interval between a first occurrence of the blink pattern and a second occurrence of the blink pattern subsequent to the first occurrence of the blink pattern; and
an acceleration sensor, wherein
the processor is further configured to, when causing the light source to blink by repeating the blink pattern, increase and change the time interval between the first occurrence of the blink pattern and the second occurrence of the blink pattern when the acceleration sensor detects that the light emitting apparatus is stationary, and reduce and make the time interval between the blink patterns constant when the acceleration sensor detects that the light emitting apparatus is moving.

2. The light emitting apparatus according to claim 1, wherein the processor is configured to randomly change the time interval between the first occurrence of the blink pattern and the second occurrence of the blink pattern.

3. The light emitting apparatus according to claim 2, wherein the processor is configured to set the time interval to a time period that is n times a blink time period of the blink pattern and randomly change the n, the n being a positive integer.

4. The light emitting apparatus according to claim 1, wherein the processor is configured to, when the acceleration sensor detects that the light emitting apparatus is stationary, make the time interval longer than when the acceleration sensor detects that the light emitting apparatus is moving.

5. A non-transitory computer readable medium storing instructions, which when executed by a processor of a light emitting apparatus, performs the steps of:
performing control to cause a light source included in the light emitting apparatus to blink in a blink pattern corresponding to output information including identification information unique to the light emitting apparatus and stored in a memory of the light emitting apparatus;
when causing the light source to blink by repeating the blink pattern, changing a time interval between a first occurrence of the blink pattern and a second occurrence of the blink pattern subsequent to the first occurrence of the blink pattern; and
when causing the light source to blink by repeating the blink pattern, increase and change the time interval between the first occurrence of the blink pattern and the second occurrence of the blink pattern when an acceleration sensor of the light emitting apparatus detects that the light emitting apparatus is stationary, and reduce and make the time interval between the blink patterns constant when the acceleration sensor detects that the light emitting apparatus is moving.

6. A light emitting apparatus comprising:
a light source;
an acceleration sensor;
means for performing control to cause the light source to blink in a blink pattern corresponding to output information including identification information unique to the light emitting apparatus and stored in a memory of the light emitting apparatus;
means for, when causing the light source to blink by repeating the blink pattern, changing a time interval between a first occurrence of the blink pattern and a second occurrence of the blink pattern subsequent to the first occurrence of the blink pattern; and
means for, when causing the light source to blink by repeating the blink pattern, increasing and changing the time interval between the first occurrence of the blink pattern and the second occurrence of the blink pattern when the acceleration sensor of the light emitting apparatus detects that the light emitting apparatus is stationary, and reducing and making the time interval between the blink patterns constant when the acceleration sensor detects that the light emitting apparatus is moving.

* * * * *